(12) United States Patent
Kurose et al.

(10) Patent No.: US 6,372,302 B1
(45) Date of Patent: Apr. 16, 2002

(54) PROCESS FOR PRODUCING A MAGNETIC RECORDING MEDIUM

(75) Inventors: Shigeo Kurose, Saku; Akihiko Seki, Nirasaki; Katsuhiko Yamazaki, Saku, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/658,118

(22) Filed: Sep. 8, 2000

(30) Foreign Application Priority Data

Sep. 10, 1999 (JP) .............................. 11-257131

(51) Int. Cl.$^7$ ................................ H01F 1/00
(52) U.S. Cl. .................. 427/548; 427/130; 427/131; 427/407.1; 427/599
(58) Field of Search ................. 427/130, 131, 427/407.1, 599, 548

(56) References Cited

FOREIGN PATENT DOCUMENTS

| JP | 58146024 A | 8/1983 |
|---|---|---|
| JP | 58-146024 | 8/1983 |
| JP | 1-30221 | 6/1989 |
| JP | 05-197946 | 8/1993 |
| JP | 05197946 A | 8/1993 |
| JP | 07182650 A | 7/1995 |
| JP | 07-182650 A | 7/1995 |
| JP | 2566085 | 12/1996 |
| JP | 2922771 | 7/1999 |

*Primary Examiner*—Bernard Pianalto
(74) *Attorney, Agent, or Firm*—Rader, Fishman & Grauer, PLLC

(57) ABSTRACT

The present invention provides a magnetic recording medium having a thinned magnetic layer, excellent electromagnetic conversion characteristics and an excellent durability, and a process for producing the same. A magnetic recording medium comprising a lower non-magnetic layer containing at least a carbon black and a radiation curing type binder resin on a non-magnetic support and an upper magnetic layer having a thickness of 0.30 $\mu$m or less on the lower non-magnetic layer, wherein the upper magnetic layer contains at least a ferromagnetic powder, a binder resin and an abrasive having a Mohs hardness of 6 or higher and a smaller average particle size than the thickness of the upper magnetic layer. The thickness of the upper magnetic layer is, for example, 0.05 to 0.30 $\mu$m. The average particle size of the abrasive is, for example, 0.01 to 0.2 $\mu$m.

2 Claims, No Drawings

PROCESS FOR PRODUCING A MAGNETIC RECORDING MEDIUM

BACKGROUND OF THE INVENTION

1. Field of the Invention

The present invention relates to a magnetic recording medium, and more specifically to a magnetic recording medium excellent in electromagnetic conversion characteristics and durability. The present invention also relates to a process for producing the magnetic recording medium.

2. Disclosure of the Related Art

Some magnetic recording media comprising a lower non-magnetic layer and an upper magnetic layer in this order formed on a non-magnetic support are disclosed in the prior art.

For example, Japanese Examined Patent Publication No. 1-30221(1989) discloses, "a magnetic recording medium formed by forming a non-magnetic underlayer on a substrate, and then forming a magnetic layer, characterized in that the underlayer is formed by using a radiation-curing coating material which contains at least two kinds of compounds selected from (A), (B) and (c) described below:

(A) radiation-curing compound having two or more unsaturated double bonds and a molecular weight of 5000 or higher, preferably 8000 or higher, (B) radiation-curing compound having one or more unsaturated double bond and a molecular weight of 400 or higher and lower than 5000, preferably 6000 to 3000, (C) radiation-curing compound having one or more unsaturated double bond and a molecular weight of lower than 400;

and by irradiating with radiation to the coated substrate." However, since there has hardly been referred to a composition of the magnetic layer in the Publication, it is difficult to obtain the magnetic recording medium having satisfactory coating layer properties.

Japanese Patent Publication (B2) No. 2566085(1996) discloses, "a magnetic recording medium comprising a non-magnetic layer based on a non-magnetic powder and a binder resin and a magnetic layer based on a ferromagnetic powder and a binder resin in this order formed on a non-magnetic substrate, characterized in that the magnetic layer has a thickness of 1.0 µm or less and contains an abrasive material which has a Mohs hardness of 6 or higher and a larger average particle size than the thickness of the magnetic layer." And the same Publication discloses "a process for producing a magnetic recording medium, characterized by preparing respectively a coating liquid for a lower non-magnetic layer including a non-magnetic powder dispersed into a binder, and a coating liquid for a magnetic layer including a ferromagnetic powder and an abrasive material having a Mohs hardness of 6 or higher and a larger average particle size than a dried thickness of the magnetic layer dispersed into a binder; coating the coating liquid for the non-magnetic layer onto the non-magnetic substrate to obtain a non-magnetic layer; and coating the coating liquid for the magnetic layer simultaneously with or successively to coating of the lower non-magnetic layer while the lower non-magnetic layer obtained is in a wet state so that a dried thickness of the magnetic layer can be 1 µm or less." However, in this producing method, because the upper magnetic layer is coated while the lower non-magnetic layer is in a wet state, an interface between the upper magnetic layer and the lower non-magnetic layer becomes non-uniform and this results in output variations. Also, as the particle size of the abrasive is larger than the thickness of the magnetic layer, problems in running durability arise.

Japanese Patent Publication (B2) No.2922771(1999) discloses a magnetic recording medium having at least two coating layers on one surface of a non-magnetic support, wherein the uppermost of the coating layers is a magnetic layer having a thickness of 0.2 to 0.5 µm and the magnetic layer of the uppermost layer includes $Al_2O_3$ particles containing an inorganic substance of an average particle size of 0.1 to 0.3 µm. And, the same Publication discloses forming the magnetic layer by wet-on-wet coating method. According to the examples of the same Publication, in both the upper magnetic layer and a lower non-magnetic layer, a thermoplastic resin is used as a binder and the magnetic layer having a thickness of 0.4 µm is formed by wet-on-wet coating method.

However, the same Publication does not particularly consider a case of a thinner thickness of the upper magnetic layer such as 0.30 µm or less, and if such an upper magnetic layer having a thinner thickness is formed by wet-on-wet coating method, an interface between the upper magnetic layer and the lower non-magnetic layer becomes non-uniform and this results in output variations.

In recent years, a magnetic layer has shown a marked trend toward a thinner layer, a higher filling and a higher durability from a demand for magnetic recording media that have an increased recording density.

SUMMARY OF THE INVENTION

Accordingly, it is an object of the present invention to provide a magnetic recording medium which solves problems of the prior art, has a thinned magnetic layer, has excellent electromagnetic conversion characteristics and has an excellent durability. It is a further object of the present invention to provide a process for producing the magnetic recording medium.

The present inventors worked assiduously and has found that even a thickness of an upper magnetic layer is as thin as 0.30 µm or less, a magnetic recording medium which has excellent electromagnetic conversion characteristics and an excellent durability can be obtained by using a radiation curing type binder resin as binder of a lower non-magnetic layer and by using an abrasive having a Mohs hardness of 6 or higher and a smaller average particle size than the thickness of the upper magnetic layer, and has completed the present invention.

That is, the present invention relates to a magnetic recording medium comprising a lower non-magnetic layer containing at least a carbon black and a radiation curing type binder resin on a non-magnetic support and an upper magnetic layer having a thickness of 0.30 µm or less on the lower non-magnetic layer, wherein in the upper magnetic layer contains at least a ferromagnetic powder, a binder resin, and an abrasive having a Mohs hardness of 6 or higher and a smaller average particle size than the thickness of the upper magnetic layer.

The thickness of the upper magnetic layer is generally 0.05 to 0.30 µm. The average particle size of the abrasive is smaller than the thickness of the upper magnetic layer, and is generally 0.01 to 0.2 µm.

A centerline average roughness (Ra) of the upper magnetic layer surface is preferably 1.0 nm≦Ra≦8.0 nm.

The abrasive preferably contains two or more kinds of abrasives which have different average particle sizes to each other.

Also, the present invention relates to a process for producing a magnetic recording medium which comprises:

preparing respectively a lower non-magnetic layer coating material including at least a carbon black dispersed into a radiation curing type binder resin, and an upper magnetic layer coating material including at least a ferromagnetic powder, and an abrasive having a Mohs hardness of 6 or higher and a smaller average particle size than a thickness of an upper magnetic layer dispersed into a binder resin, applying the lower non-magnetic layer coating material onto a non-magnetic support, drying the coating material, and carrying out smoothing treatment of and irradiating with radiation to resulting layer to form a lower non-magnetic layer, and then applying the upper magnetic layer coating material onto the lower non-magnetic layer, drying the coating material, and carrying out smoothing treatment of resulting layer to form an upper magnetic layer.

Furthermore, the present invention relates to the magnetic recording medium produced by said process.

According to the present invention, a magnetic recording medium having a thinned magnetic layer and being excellent in electromagnetic converting characteristics and in durability is provided.

DETAILED DESCRIPTION OF THE INVENTION

Now, the specific configurations of the present invention will be described in detail thereafter.

The magnetic recording medium of the present invention has at least two coating layers on a non-magnetic support, that is, a lower non-magnetic layer and an upper magnetic layer having a thickness of 0.3 µm or less formed in this order, and on the other surface of the non-magnetic support, a back-coat layer is formed as required. Further, in the present invention, a lubricant coating layer, and/or various coating layers for protecting the magnetic layer may be formed on the upper magnetic layer as required. Also, on the surface of the non-magnetic support, on which the magnetic layer is to be formed, an undercoat layer (adhesion facilitating layer) may be formed for improving adhesion between the coating layer and the non-magnetic support.

Lower Non-Magnetic Layer

The lower non-magnetic layer contains at least a carbon black and a radiation curing type binder resin.

By allowing the lower non-magnetic layer to contain carbon black, a lubricant can be held in the layer. As a result, the content of the lubricant on the upper magnetic layer surface is able to be easily adjusted to a desired range. In the present invention, as the thickness of the upper magnetic layer is as thin as 0.3 µm or less, it is difficult for the upper magnetic layer only to contain a sufficient amount of lubricant, and the carbon black of the lower layer is an essential component. Also, the carbon black of the lower non-magnetic layer has an effect to lower the surface electric resistance of the upper magnetic layer as well as an effect to reduce the light transmittance.

Examples of carbon black contained in the non-magnetic layer include furnace black for rubber, thermal black for rubber, black for color, acetylene black, etc. Preferably the carbon black has a specific surface area of 5 to 600 m²/g, a DBP oil absorption of 30 to 400 mL/100 g, and a particle size of 10 to 100 nm. The carbon black which can be used may be referred specifically to "Carbon Black Almanac," compiled by the Society of Carbon Black.

For the non-magnetic layer, various inorganic powders may be used in addition to carbon black, and for example, needle-like non-magnetic iron oxide ($\alpha$-$Fe_2O_3$), etc. may be used. However, the use of spherical super-fine particle iron oxide can achieve high dispersibility, and the filling ratio of particles in the non-magnetic layer can be increased. Consequently, the surface smoothness of the non-magnetic layer itself is improved, and as a result, the surface smoothness of the magnetic layer is improved, and the electromagnetic conversion characteristics are improved. In addition to these, various non-magnetic powders such as $CaCO_3$, titanium oxide, barium sulfate, $\alpha$-$Al_2O_3$ may be used.

The composition ratio of carbon black to inorganic powders is preferably 100/0 to 75/25 by weight ratio. When the composition ratio of inorganic powders exceeds 25 parts by weight, problems occur in surface electric resistance.

The composition ratio of carbon black in the lower non-magnetic layer is 35 to 90% by weight and preferably 40 to 85% by weight. When the composition ratio of carbon black is less than 35% by weight, the desired amount of lubricant is unable to be held. On the other hand, when carbon black is used in the ratio of 90% by weight, the sufficient amount of lubricant is able to be held, and when carbon black is used more than 90% by weight, the ratio of the binder resin in the lower non-magnetic layer lowers and sufficient strength of the coating layer is unable to be obtained.

The binder resin which is able to be used for the non-magnetic layer is limited to the radiation curing type binder resin. With a thermoplastic resin and a thermosetting resin which have been used conventionally, the raw roll coated with non-magnetic layer must be placed in an oven for a long time (for example, at 70° C. for 2 to 48 hours) and cured in order to obtain sufficient coating layer properties. This causes problems of deformation of the non-magnetic coating layer due to tightened winding or deteriorating surface smoothness of the non-magnetic coating layer, not to mention the time and labor required in the manufacturing process.

In the manufacturing method for coating the upper magnetic layer while the lower non-magnetic layer is still wet, as disclosed in Japanese Patent Publication No. 2566085, the interface between the upper magnetic layer and the lower non-magnetic layer becomes non-uniform, and this results in output variations.

In order to eliminate defects like these, in the present invention, the radiation curing type binder resin is used for the binder resin of the lower non-magnetic layer, the lower non-magnetic layer coating material is applied on a non-magnetic support, dried, and smoothened; then, radiation is irradiated, the three-dimensional crosslinking is allowed to occur; and then, the upper magnetic layer coating material is applied on the lower layer, and thereby a good result is able to be obtained. According to this process, since the lower non-magnetic layer has the three-dimensional crosslinking when the upper magnetic layer is formed, it is not subject to swelling caused by an organic solvent. Consequently, because the magnetic coating material is able to be applied directly to the lower non-magnetic layer immediately after the lower non-magnetic layer is formed, continuation and simplification of the process is able to be achieved.

The radiation curing type binder resin used in the present invention is the resin containing one or more unsaturated double bonds in the molecular chains which generates radicals by radiation and cures by crosslinking or polymerizing.

Examples of radiation curing type binder resin include vinyl chloride type resin, polyurethane resin, polyester resin, epoxy type resin, phenoxy resin, fiber type resin, polyether type resin, polyvinyl alcohol type resin, and many other resins. Of these, vinyl chloride type resin and polyurethane resin are typical, and it is preferable to use the both in combination.

The radiation curing vinyl chloride type resin is synthesized by modifying a vinyl chloride type resin as raw material to radiation functional type resin. For the vinyl chloride type resin as raw material, the vinyl chloride type resin of which vinyl chloride content is 60 to 100% by weight, and preferably 60 to 95% by weight in particular. Examples of such vinyl chloride type resin include vinyl chloride-vinyl acetate-vinyl alcohol copolymer, vinyl chloride-hydroxyalkyl (meth) acrylate copolymer, vinyl chloride-vinyl acetate-maleic acid copolymer, vinyl chloride-vinyl acetate-vinyl alcohol-maleic acid copolymer, vinyl chloride- hydroxyalkyl (meth) acrylate-maleic acid copolymer, vinyl chloride-vinyl acetate-vinyl alcohol-glycidyl (meth) acrylate copolymer, vinyl chloride-hydroxyalkyl (meth) acrylate- glycidyl (meth) acrylate copolymer, vinyl chloride-hydroxyalkyl (meth)acrylate-allyl glycidyl ether copolymer, vinyl chloride-vinyl acetate-vinyl alcohol- allyl glycidyl ether copolymer, and the like. Especially, a copolymer of vinyl chloride and a monomer which contains epoxy(glycidyl) group is preferable. And, the average polymerization degree of the copolymer is preferably 100 to 900, and more preferably 100 to 600.

Furthermore, in order to improve dispersibility, it is preferable to introduce polar groups such as —$SO_4Y$, —$SO_3Y$, —POY, —$PO_2Y$, —$PO_3Y$, —COOY (Y represents H or alkaline metal), —SR, —$NR_2$, —$N^+R_3Cl^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

As methods for modifying the vinyl chloride type resin to radiation functional type resin, for resins having hydroxy group or carboxylic acid group, a modifying method by reacting the resin with a compound having (meth) acrylic group and carboxylic anhydride or dicarboxylic acid, a modifying method by reacting the resin with a reactant (adduct) of tolylene diisocyanate (TDI) and 2-hydroxyethyl methacrylate (2-HEMA), and a modifying method by reacting the resin with a monomer which has one or more ethylene unsaturated double bond and one isocyanate group in a molecule and has no urethane link in molecule are typical. Of these methods, the third one is excellent in modification easiness, and dispersibility and physical properties after modification, therefore the modification is preferably carried out by the third method. Said monomers include 2-isocyanate ethyl (meth) acrylate, and the like.

Acryl groups or methacrylic groups in the binder molecule preferably exist 1 to 20, and more preferably 2 to 15 on average per molecule.

The radiation curing polyurethane resin is an urethane resin having at least one acrylic bond in its molecule, namely a polyurethane acrylate compound formed by bonding to a compound containing acrylic type double bonds through urethane bond.

The acrylic type double bond mentioned here represents a residue (acryloyl group or methacryloyl group) of acrylic acid, acrylic ester, acrylic amide, methacrylic acid, methacrylic ester, methacrylic amide, and the like.

As the compound containing acrylic type double bonds (A), mono(meth)acrylates of glycol such as ethylene glycol, diethylene glycol, hexamethylene glycol, and the like; mono (meth)acrylates and di(meth)acrylates of triol compound such as trimethylolpropane, glycerin, trimetylolethane, and the like; mono(meth)acrylates, di(meth)acrylates and tri (meth)acrylates of tetra- or more valent polyol such as pentaerythritol, dipentaerythritol, and the like; acrylic type compounds containing hydroxy group such as, glycerin monoallyl ether, glycerin diallyl ether and the like are suitable. These acrylic type double bonds need to exist at least one and preferably 2 to 20 in the binder molecule.

The polyurethane acrylate resin is generally obtained by a reaction of a resin containing hydroxy group(B') and an acrylic type compound containing hydroxyl group(A') and a compound containing polyisocyanate(C').

Examples of the resin containing hydroxy group include polyalkylene glycols such as polyethylene glycol, polybutylene glycol, polypropylene glycol, and the like, alkylene oxide adduct of bisphenol A, polyether polyols (B') which has various kinds of glycols and hydroxyl groups at the terminal of the molecular chain. Of these, a polyurethane acrylate resin obtained by using polyether polyol (B') as one component is preferable.

Examples of carboxylic acid component of polyether polyol(B') include aromatic dicarboxylic acids such as terephthalic acid, isophthalic acid, orthophthalic acid, 1,5-naphthalic acid, and the like, aromatic oxycarboxylic acids such as p-oxybenzoic acid, p-(hydroxyethoxy)benzoic acid, and the like, aliphatic dicarboxylic acids such as succinic acid, adipic acid, azelaic acid, sebacic acid, dodecanoic dicarboxylic acid, and the like, unsaturated aliphatic acids and alicyclic dicarboxylic acids such as fumaric acid, maleic acid, itaconic acid, tetrahydrophthalic acid, hexahydrophthalic acid, and the like, tri- or tetra-carboxylic acids such as trimellitic acid, trimesic acid, pyromellitic acid, and the like.

Examples of glycol component of the polyether polyol (B') include ethylene glycol, propylene glycol, 1,3-propanediol, 1,4-butanediol, 1,5-pentanediol, 1,6-hexanediol, neopentyl glycol, diethylene glycol, diproylene glycol, 2,2,4-trimethyl-1,3-pentanediol, 1,4-cyclohexanedimethanol, ethylene oxide adducts and propylene oxide adducts of bisphenol A, etc., ethylene oxide and propylene oxide adduct of hydrogenated bisphenol A, polyethylene glycol, polypropylene glycol, polytetramethylene glycol, and the like. Also, tri- or tetra-ols such as trimethylolethane, trimetylolpropane, glycerin, pentaerythritol, and the like may be used in combination.

Examples of polyether polyol include, in addition to the examples mentioned above, lactone type polyesterdiol chain obtained by ring opening polymerization of lactone such as caprolactone.

Examples of polyisocyanate (C') used include diisocyanate compounds such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-demethyl-4,4'-biphenylene diisocyanate, 4,4'-diphenylene diisocyanate, 4,4'-diisocyanate-diphenyl ether, 1,5-naphthalene diisocyanate, p-xylylene diisocyanate, m-xylylene diisocyanate, 1,3-diisocyanate methylcyclohexane, 1,4-isocyanate methylcyclohexane, 4,4'-diisocyanate dicyclohexane, 4,4'-diisocyanate cyclohexylmethane, isophorone diisocyanate, and the like, or triisocyanate compounds such as 2,4-tolylene diisocyanate-trimer, hexamethylene diisocyanate-trimer of 7 or lower mol % in all isocyanate groups, and the like.

Furthermore, in order to improve dispersibility, it is preferable to introduce polar groups such as —SO$_4$Y, —SO$_3$Y, —POY, —PO$_2$Y, —PO$_3$Y, —COOY (Y represents H or alkaline metal), —SR, —NR$_2$, —N$^+$R$_3$Cl$^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

On the other hand, apart from the above synthetic method of the radiation curing type urethane, modification of thermosetting type polyurethane resin as raw material to radiation functional type resin may be carried out, in the same method as the vinyl chloride type resin.

Also, a radiation curing type monomer or an oligomer may be used as required, and the use of them enables the coating layer to have a higher crosslinking degree. The additional content is preferably 30 parts by weight or less, and more preferably 20 parts by weight or less with respect to the resin contained in the lower non-magnetic layer coating material. When the content exceeds 30 parts by weight, the coating material is given a strong influence and this conversely results in a lower gloss. The radiation curing type monomer or oligomer may be added either after preparing the coating material or the time of dispersing.

The content of the radiation curing binder in the lower non-magnetic layer is preferably 10 to 100 parts by weight, and more preferably 12.5 to 70 parts by weight with respect to 100 parts by weight of the total of carbon black and organic powders. When the content of the binder is excessively small, the ratio of binder resin in the lower non-magnetic layer lowers and sufficient strength of the coating layer is unable to be obtained. When the content of the binder is excessively large, dispersion failure occurs at the time of preparing the lower non-magnetic layer coating material and a smooth surface of the lower non-magnetic layer is unable to be formed.

Examples of radiation used in the present invention include the electron beam, γ ray, β ray, ultraviolet ray, etc., and the preferable one is the electron beam. The irradiation dose is preferably 1 to 10 Mrad and more preferably 3 to 7 Mrad. The irradiation energy (acceleration voltage) is preferably 100 kV or more. The radiation is preferably irradiated before winding after coating and drying, but it may be irradiated after winding.

In the lower non-magnetic layer of the present invention, the lubricant is preferably contained as required. For the lubricant, irrespective of saturated or unsaturated, one or two kinds or more of known fatty acids, esters, and saccharides may be used individually or mixed. Preferably, two kinds or more of fatty acids and/or esters having respectively different melting points are used in combination. This is because the lubricant that matches any temperature environment used for the magnetic recording medium must be continuously fed to the medium surface.

Specifically, for the fatty acid, saturated straight-chain fatty acids such as stearic acid, palmitic acid, myristic acid, lauric acid, erucic acid etc.; fatty acids which are saturated and have side chains, such as isocetylic acid, isostearic acid, etc.; and unsaturated fatty acids such as oleic acid, linoleic acid, linolenic acid, etc. can be used suitably. For esters, there are straight-chain saturated fatty acid esters such as butyl stearate, butyl palmitate, etc.; saturated fatty acid esters with side chains such as isocetyl stearate, isostearyl stearate etc.; unsaturated fatty acid esters such as isostearyl oleate, etc.; fatty acid esters of unsaturated alcohol such as oleyl stearate, etc.; esters of unsaturated fatty acid and unsaturated alcohol such as oleyl oleate, etc.; esters of dihydric alcohol such as ethylene glycol distearate, etc.; esters of dihydric alcohol and unsaturated fatty acid esters such as ethylene glycol monooleate, ethylene glycol dioleate, neopentyl glycol dioleate, etc.; and esters of saturated or unsaturated fatty acid and saccharides such as sorbitan monostearate, sorbitan tristearate, sorbitan monooleate, sorbitan trioleate, etc. The content of the lubricant of the lower non-magnetic layer may be adjusted suitably in accord with objects, but is preferably 1 to 20% by weight with respect to the total weight parts of carbon black and inorganic powders.

The coating material for forming the lower non-magnetic layer is prepared by adding an organic solvent to the above-mentioned components. There is no particular limit to the organic solvent used, and one or two kinds or more of various solvents such as ketone type solvents such as methyl ethyl ketone (MEK), methyl isobutyl ketone, cyclohexanone, etc., or aromatic type solvents such as toluene, etc. may be suitably chosen and used. The amount of organic solvent added may be about 100 to 900 parts by weight with respect to 100 parts by weight of a total amount of solids (carbon black and various inorganic powders, etc.) and the binder.

The surface roughness of the lower non-magnetic layer (here, the surface roughness was expressed by the centerline average roughness (JIS-B-0601) Ra) must be satisfactory. Ra after smoothing treatment of the lower non-magnetic layer is preferably 8.0 nm or lower, and more preferably 6.0 nm or lower, and the most preferably 5.0 nm or lower. When Ra exceeds 8.0 nm, the interface between the upper magnetic layer and the lower non-magnetic layer tends to become non-uniform, and output variation tends to occur.

The thickness of the lower non-magnetic layer is in general 0.1 to 2.5 μm, and preferably 0.3 to 2.3 μm. When the non-magnetic layer is excessively thin, it tends to be subject to the influence of surface roughness of the non-magnetic support, and as a result, the surface smoothness of the non-magnetic layer is degraded and the surface smoothness of the magnetic layer tends to be degraded, and the electromagnetic conversion characteristics tend to lower. In addition, because the light transmittance becomes higher, problems occur when the tape end is detected by the change of light transmittance. On the other hand, increasing the thickness of the non-magnetic layer exceeding a certain level does not improve the performance.

Upper Magnetic Layer

The upper magnetic layer contains at least a ferromagnetic powder, a binder resin, and an abrasive having a Mohs hardness of 6 or higher and a smaller average particle size than a thickness of the upper magnetic layer.

In the present invention, for the ferromagnetic powder, metal alloy fine powder or hexagonal plate-like fine powder are desirable to be used. Preferably the metal alloy fine powder has a coercive force Hc of 1500 to 3000 Oe, a saturation magnetization σ s of 120 to 160 emu/g, an average major axis length of 0.05 to 0.2 μm, an average minor axis length of 10 to 20 nm, and an aspect ratio of 1.2 to 20. Hc of the medium fabricated is preferably 1500 to 3000 Oe. For additive elements, Ni, Zn, Co, Al, Si, Y and other rare earth elements etc. may be added in accord with purposes. Preferably the hexagonal plate-like fine powder has a coercive force Hc of 1000 to 2000 Oe, a saturation magnetization σ s of 50 to 70 emu/g, an average flake particle diameter of 30 to 80 nm, and a plate ratio of 3 to 7. Hc of the medium fabricated is preferably 1200 to 2200 Oe. For additive elements, Ni, Co, Ti, Zn, Sn and other rare earth elements etc. may be added in accord with purposes. For other materials, known materials may be used in accord with purposes without particular limitation.

The above ferromagnetic powder may be contained by about 70 to 90 parts by weight in the magnetic layer composition. When the content of the ferromagnetic powder is excessively large, the content of the binder reduces and the surface smoothness by calendering tends to be degraded, whereas when the content of the ferromagnetic powder is excessively small, no high reproduction output is able to be obtained.

For the binder resin, there is no particular limit to the resin used if it is generally used, and any of thermoplastic resin, thermosetting or reactive type resin, and radiation curing type binder resin may be used.

Examples include polyester-polyurethane resin, vinyl chloride type copolymer, vinyl chloride-acrylate type copolymer, vinyl chloride-vinyl acetate type copolymer, vinyl chloride-vinylidene chloride type copolymer, vinyl chloride-acrylonitrile type copolymer, acrylate-acrylonitrile type copolymer, acrylate-vinylidene chloride type copolymer, methacrylate-vinylidene chloride type copolymer, methacrylate-ethylene type copolymer, poly (vinyl fluoride)-vinylidene chloride-acrylonitrile type copolymer, acrylonitrile-butadiene type copolymer, polyamide resin, poly(vinyl butyral), cellulose derivatives (cellulose acetate butyrate, cellulose diacetate, cellulose triacetate, cellulose propionate, nitrocellulose, etc.), styrene-butadiene type copolymer, polyester resin-chlorovinylether acrylate type copolymer, amino resin, and synthetic rubber thermoplastic resins etc.

The content of the binder used for the magnetic layer is 5 to 40 parts by weight, and particularly preferably 10 to 30 parts by weight with respect to 100 parts by weight of ferromagnetic powders. When the content of the binder is excessively small, the strength of the magnetic layer lowers, and the running durability tends to be degraded. On the other hand, when the content of the binder is excessively large, the content of ferromagnetic powders lowers and the electromagnetic conversion characteristics tend to be degraded.

For a crosslinking agent for curing these binders, various polyisocyanates, particularly, diisocyanate can be used, and particularly, one or more kinds of tolylene diisocyanate, hexamethylene diisocyanate, methylene diisocyanate are preferably used. The crosslinking agent is particularly preferably used as crosslinking agent modified by compound having two or more hydroxyl groups such as trimethylolpropane, etc. or isocyanurate type crosslinking agent consisting of three molecules of diisocyanate compound, and is bonded to functional groups, etc. contained in the binder resin and crosslink the resin. The content of the crosslinking agent is preferably 10 to 30 parts by weight with respect to 100 parts by weight of the binder. Such thermosetting resins may be cured by heating in an oven at 50 to 70° C. for 12 to 48 hours in general.

In addition, in the magnetic layer, the abrasive having the Mohs hardness of 6 or higher and smaller average particle size than the thickness of the upper magnetic layer is contained in order to improve mechanical strength of the magnetic layer and to prevent clogging of the magnetic head.

Examples of the abrasive include α-alumina (Mohs hardness: 9), chromium oxide (Mohs hardness: 9), silicon carbide (Mohs hardness: 9.5), silicon oxide (Mohs hardness 7), aluminum nitride (Mohs hardness: 9), boron nitride (Mohs hardness: 9.5), etc. Of these abrasives, it is preferable that at least one kind of abrasives with a Mohs hardness of 9 or higher are contained. These are, in general, amorphous, prevent clogging of the magnetic head, and improve the strength of the coating layer.

It is necessary for the average particle size of the abrasive to be smaller than the thickness of the upper magnetic layer. The average particle size of the abrasive is, for example, 0.01 to 0.2 $\mu$m, and preferably 0.05 to 0.2 $\mu$m although it depends on the thickness of the upper magnetic layer. When the average particle size is excessively large, the projections from the magnetic layer surface increase, and thereby, degradation of electromagnetic conversion characteristics, increase of drop-out and increase of head wear etc. tend to occur. When the average particle size is excessively small, the projections from the magnetic layer surface decrease and effects of preventing head clogging become insufficient.

Also, for the abrasive, it is preferable that two or more kinds of abrasives which have different average particle sizes to each other are contained. Furthermore, decrease of output variations and improvement of running durability are hopefully obtained.

The average particle size is, in general, measured by a transmission electron microscope. The content of the abrasive is preferably 3 to 25 parts by weight, and more preferably 5 to 20 parts by weight with respect to 100 parts by weight of the ferromagnetic powders.

In addition, in the magnetic layer, a dispersing agent such as surfactant, etc., a lubricant such as higher fatty acid, fatty acid ester, silicon oil, etc., and other various additives may be added as required.

The coating material for forming the magnetic layer may be prepared by adding organic solvents to each component mentioned above. There is no particular limitation to the organic solvent used and organic solvents similar to those used for the lower non-magnetic layer may be used.

The thickness of the upper magnetic layer Is 0.30 $\mu$m or less, and preferably 0.05 to 0.30 $\mu$m, and more preferably 0.10 to 0.25 $\mu$m. The thickness of less than 0.20 $\mu$m, for example 0.15 $\mu$m, is also preferable. When the magnetic layer is excessively thick, self-magnetization loss and thickness loss increase.

The centerline average roughness (Ra) of the magnetic layer surface is preferably 1.0 to 8.0 nm, and more preferably 2.0 to 7.0 nm. When Ra is less than 1.0 nm, the surface is excessively smooth, and thereby the running stability is degraded, and troubles during running tend to occur frequently. On the other hand, when Ra exceeds 8.0 nm, the magnetic layer surface becomes rough, and thereby electromagnetic conversion characteristics such as reproduced output, etc. tend to be degraded.

Back-Coat Layer

The back-coat layer is provided for improving the running stability and preventing electrification of the magnetic layer, etc. The back-coat layer preferably contains 30 to 80% by weight of carbon black. When the carbon black content is excessively small, the electrification preventing effect tends to lower, and in addition, the running stability tends to lower. Also the light transmittance of the medium tends to increase, and thereby problems occur in the system for detecting the tape end by the change of light transmittance. On the other hand, when the carbon black content is excessively large, the strength of the back-coat layer lowers, and the running durability tends to degrade. Any kind of carbon black may be used if it is used in general, and the average particle size is preferably about 5 to 500 nm. The average particle size is, in general, measured by a transmission type electron micrograph.

In the back-coat layer, besides the carbon black, non-magnetic inorganic powders such as various abrasives, etc. mentioned above in describing the magnetic layer may be contained in order to improve the mechanical strength. The content of non-magnetic inorganic powder is preferably 0.1 to 5 parts by weight, and more preferably 0.5 to 2 parts by weight with respect to 100 parts by weight of carbon black. The average particle size of non-magnetic inorganic powder is preferably 0.1 to 0.5 μm. When the content of this kind of non-magnetic inorganic powder is excessively small, the mechanical strength of the back-coat layer tends to become insufficient, while if the content is excessively great, the wear rate of guides, etc. in the tape sliding passage tends to increase.

In addition to these, a dispersing agent such as surfactant, etc., a lubricant such as higher fatty acid, fatty acid ester, silicon oil, etc., and other various additives may be added as required.

The binder, crosslinking agent, solvent, etc. used for the back-coat layer may be the same as those used for the coating material for the magnetic layer mentioned above. The content of the binder is preferably 15 to 200 parts by weight, and more preferably 50 to 180 parts by weight with respect to 100 parts by weight of the total solids except the binder. When the binder content is excessively large, friction with the medium sliding passage becomes excessively large, the running stability lowers, and hence running accidents tend to occur frequently. In addition, problems such as blocking with the magnetic layer, etc. tend to occur. When the binder content is excessively small, the strength of the back-coat layer lowers and the running durability tends to lower.

The thickness of the back-coat layer (after calendering) is 1.0 μm or less, and preferably 0.1 to 1.0 μm, and more preferably 0.2 to 0.8 μm. When the back-coat layer is excessively thick, friction with the medium sliding passage becomes too large, and hence the running stability tends to lower. On the other hand, when the back-coat layer is excessively thin, the surface smoothness of the back-coat layer lowers due to influence of the surface roughness of the non-magnetic support. Consequently, when the back-coat is thermo-cured, the surface roughness of the back-coat layer is transferred to the magnetic layer surface, resulting in lowering of the output in high-frequencies, S/N and C/N. When the back-coat layer is excessively thin, abrasion of the back-coat layer occurs during the running of the medium.

Non-Magnetic Support

There is no particular limitation to materials used for the non-magnetic support. The material of the non-magnetic support may be selected from various flexible materials and various rigid materials corresponding to the object and made into a given shape and size such as a tape form corresponding to various standards. Examples of the flexible material include various type resins, for example, polyesters such as polyethylene terephthalate and polyethylene naphthalate, polyolefins such as polypropylene, polyamides, polyimides and polycarbonates.

The thickness of the non-magnetic support is preferably 3.0 to 75.0 μm. The shape of the non-magnetic support may be, though not particularly limited to, a tape form, sheet form, card form or disk form and the like. Various materials may be selected and used according to the shape and requirements.

The surface roughness of the non-magnetic support used in the present invention is 20 nm or lower, and preferably 15 nm or lower in terms of the centerline average surface roughness Ra. The surface roughness of the non-magnetic support is freely controlled by the size and the amount of filler added to the non-magnetic support as required. Examples of the filler include organic resin fine powder such as acrylic type resin in addition to oxides or carbonates of Ca, Si, T, Al and the like, and a combination of $Al_2O_3$ and organic resin fine powder is preferable.

Manufacturing Process

The magnetic recording medium of the present invention may be manufactured by preparing the lower non-magnetic layer coating material and the upper magnetic layer coating material, respectively, using the above-mentioned materials, and applying the coating materials on the non-magnetic support in this order.

Each coating material for the lower non-magnetic layer and the upper magnetic layer is manufactured by at least a kneading step and a dispersing step, as well as by a mixing step, viscosity adjusting step and filtering step before and/or after these steps, as required. Each step may be divided into two or more stages. Any of the materials such as ferromagnetic powders, non-magnetic inorganic powders, binders, abrasives, carbon blacks, lubricants, solvents, etc. may be added at the beginning or in the midway of any step. In addition, individual material may be divided and added in two or more steps.

For kneading and dispersing of the coating material, the conventionally known techniques may, of course, be used in part or whole of the processes, but in the kneading step, any machine having strong kneading force such as a continuous kneader or a pressure kneader is preferably used. When the continuous kneader or the pressure kneader is used, the ferromagnetic powder or the non-magnetic inorganic powder and all or part of the binder (however, preferably 10% or more by weight of all the binder) are kneaded. The slurry temperature at the time of kneading is preferably 50° C. to 110° C.

For dispersing the coating material, it is desirable to use a dispersing media of high specific gravity, and ceramic type media such as zirconia, titania, etc. are suitable. Glass beads, metal beads, alumina beads, etc. which have been conventionally used may be selected and used depending on the composition.

In the manufacturing method for the magnetic recording medium of the present invention, the lower non-magnetic layer coating material is applied onto the non-magnetic support and dried, and resulting layer is subjected to smoothing treatment and cured by irradiating with radiation to obtain the lower non-magnetic layer, and then the upper magnetic layer coating material is applied onto said lower non-magnetic layer.

The back-coat layer may be formed before or after or simultaneously with formation the lower non-magnetic layer and the upper magnetic layer.

For the coating means, any of, for example, gravure coat, reverse coat, extrusion nozzle, etc. may be used, but the method for using die nozzle coater is preferable from the viewpoint of operability and productivity.

After applying the lower non-magnetic layer coating material, the coating material may be dried at drying temperature of room temperature to about 300° C. The smoothing treatment may be carried out like a smoothing treatment of the magnetic layer mentioned below. After the smoothing treatment, the non-magnetic layer cured by irradiating with radiation is obtained.

Subsequently, the upper magnetic layer coating material mentioned above is applied onto the lower non-magnetic layer.

In the present invention, in the case of magnetic tapes, it is preferable to orient magnetic particles in the magnetic layer by applying the magnetic field after the magnetic layer is formed. The orientation direction may be parallel or vertical or slanting with respect to the running direction of the medium in accord with purposes. In order to orient to the specified direction, it is preferable to apply the magnetic field 1000G or more with permanent magnet such as ferrite magnet or rare earth magnet, etc., electromagnet, solenoid, etc. or to use a plurality of these magnetic field generating means in combination. Furthermore, to achieve the highest orientation after drying, a suitable drying step may be effected before orientation or orientation is carried out simultaneously with drying. In the case of floppy disks, magnetic powders naturally oriented by coating may be brought to the non-orientation condition as much as possible with permanent magnet, electromagnet, solenoid, etc.

The magnetic coating layer that has undergone the orientation treatment after coating in this way is, in general, dried and fixed by known drying and evaporation means such as hot air, far infrared rays, electric heater, vacuum equipment, etc. equipped inside the drying furnace. The drying temperature is in the range from room temperature to about 300° C., and may be suitably selected in accord with the heat resistance of the non-magnetic support, kind and/or concentration of solvent, etc., and temperature gradient may be provided inside the drying furnace. In addition, the gas atmosphere inside the drying furnace may be, in general, air or inert gas.

After drying the magnetic layer in this way, calendering is carried out for surface smoothing treatment as required. For the calendering roll, a combination of heat-resistant plastic rolls such as epoxy, polyester, nylon, polyimide, polyamide, polyimideamide, etc. (rolls with carbon, metal, or other inorganic compounds kneaded may be used) and metal rolls (three to seven-high combination) may be used. Also, a combination of metal rolls only may be used. The treatment temperature is preferably 90° C. or higher, and more preferably 100° C. or higher. The linear pressure is preferably 200 kg/cm or higher, and more preferably 250 kg/cm or higher, and the treatment speed is in the range from 20 m/min to 900 m/min. In the present invention, further effects can be obtained by the treatment temperature of 100° C. or higher and the linear pressure of 250 kg/cm or higher.

EXAMPLES

The present invention will be described in more detail referring to embodiments, but the present invention should not be limited to these embodiments.

| [Preparation of upper magnetic layer coating material (a)] | |
|---|---|
| (Preparation of binder solution) | |
| Vinyl chloride type resin (MR-110, manufactured by Nippon Zeon Co., Ltd.) | 10 parts by weight |

| -continued | |
|---|---|
| [Preparation of upper magnetic layer coating material (a)] | |
| Polyester polyurethane resin (UR-8300, manufactured by Toyobo Co., Ltd.) | 7 parts by weight |
| MEK (methyl ethyl ketone) | 21 parts by weight |
| Toluene | 21 parts by weight |
| Cyclohexanone | 21 parts by weight |

The above compositions were charged into a hyper mixer and mixed with stirring to give a binder solution.
(Kneading)
The following compositions were charged into a pressure kneader and kneaded for 2 hours.

| | |
|---|---|
| α-Fe magnetic powder (Hc = 1650 Oe, σs = 126 emu/g, BET = 57 m$^2$/g, major axis length = 0.10 μm) | 100 parts by weight |
| α-Al$_2$O$_3$ (HIT-60A, manufactured by Sumitomo Chemical Co., Ltd.; average particle size = 0.20 μm) | 2 parts by weight |
| α-Al$_2$O$_3$ (HIT-82, manufactured by Sumitomo Chemical Co., Ltd.; average particle size = 0.13 μm) | 10 parts by weight |
| The binder solution | 40 parts by weight |

The following compositions were added to the slurry after kneading, and the slurry was adjusted to an optimum viscosity for dispersing treatment.

| | |
|---|---|
| The binder solution | 40 parts by weight |
| MEK | 15 parts by weight |
| Toluene | 15 parts by weight |
| Cyclohexanone | 15 parts by weight |

(Dispersion)
The slurry was dispersed by a sand mill.
(Viscosity Adjusting Solution)
The following compositions were charged into a hyper mixer and mixed with stirring for one hour to give a viscosity adjusting solution. The viscosity adjusting solution was circulation-filtered by using a depth filter with 95% cut filtration accuracy of 1.2 μm.

| | |
|---|---|
| Stearic acid | 0.5 part by weight |
| Myristic acid | 0.5 part by weight |
| Butyl stearate | 0.5 part by weight |
| MEK | 210 parts by weight |
| Toluene | 210 parts by weight |
| Cyclohexanone | 210 parts by weight |

(Viscosity Adjustment)
After the above solution and the dispersed slurry were mixed with stirring, the mixture was subjected to dispersion treatment again by a sand mill to give a coating material. The coating material was circulation-filtered by using a depth filter with 95% cut filtration accuracy of 1.2 μm.
(Final Coating Material)
To 100 parts by weight of the coating material after filtration, 0.8 part by weight of an isocyanate compound (Coronate-L, manufactured by Nippon Polyurethane) was added, and the mixture was mixed with stirring and circulation-filtered by using a depth filter with 95% cut filtration accuracy of 1.2 μm to give a final coating material (a) for magnetic layer.

Preparation of Upper Magnetic Layer Coating Materials (b)–(j)

Upper magnetic layer coating materials (b)–(j) were prepared in the same manner as in the above preparation of the upper magnetic layer coating material (a) except that the followings were respectively used as the abrasive in place of a total of 12 parts by weight of $\alpha$-$Al_2O_3$.

| | |
|---|---|
| (b) $\alpha$-$Al_2O_3$ (HIT-60A, manufactured by Sumitomo Chemical Co., Ltd.; average particle size = 0.20 $\mu$m) | 12 parts by weight |
| (c) $\alpha$-$Al_2O_3$ (HIT-82, manufactured by Sumitomo Chemical Co., Ltd.; average particle size = 0.13 $\mu$m) | 12 parts by weight |
| (d) $\alpha$-$Al_2O_3$ (AKP-100, manufactured by Sumitomo Chemical Co., Ltd.; average particle size = 0.06 $\mu$m) | 12 parts by weight |
| (e) $\alpha$-$Al_2O_3$ (HIT-100, manufactured by Sumitomo Chemical Co., Ltd.; average particle size = 0.04 $\mu$m) | 12 parts by weight |
| (f) $\alpha$-$Al_2O_3$ (HIT-82, manufactured by Sumitomo Chemical Co., Ltd.; average particle size = 0.13 $\mu$m) | 2 parts by weight |
| $\alpha$-$Al_2O_3$ (AKP-100, manufactured by Sumitomo Chemical Co., Ltd.; average particle size = 0.06 $\mu$m) | 10 parts by weight |
| (g) $\alpha$-$Al_2O_3$ (HIT-82, manufactured by Sumitomo Chemical Co., Ltd.; average particle size = 0.13 $\mu$m) | 2 parts by weight |
| $\alpha$-$Al_2O_3$ (HIT-100, manufactured by Sumitomo Chemical Co., Ltd.; average particle size = 0.04 $\mu$m) | 10 parts by weight |
| (h) $\alpha$-$Al_2O_3$ (AKP-20, manufactured by Sumitomo Chemical Co., Ltd.; average particle size = 0.50 $\mu$m) | 12 parts by weight |
| (i) $\alpha$-$Al_2O_3$ (E-700, manufactured by Norton Co., Ltd.; average particle size = 0.30 $\mu$m) | 12 parts by weight |
| (j) chromium oxide | 12 parts by weight |

(S-1, manufactured by Nippon Chemical Industrial Ltd.; average particle size=0.40 $\mu$m)

Preparation of Lower Non-magnetic Layer Coating Material(k)

(Preparation of Binder Solution)

| | |
|---|---|
| Electron radiation curing type vinyl chloride type resin (Vinyl chloride-epoxy containing monomer copolymer; average degree of polymerization = 310; epoxy content = 3 wt %; S content = 0.6 wt %; acryl content = 6 groups/1 molecule; Tg = 60° C.) | 10 parts by weight |
| Electron radiation curing type polyester polyurethane resin (Phosphorus compound-hydroxy containing polyester polyurethane; number average molecular weight = 13000; acryl content = 6 groups/1 molecule; Tg = 10° C.) | 7 parts by weight |
| MEK | 21 parts by weight |
| Toluene | 21 parts by weight |
| Cyclohexanone | 21 parts by weight |

The above compositions were charged into a hyper mixer and stirred to give a binder solution.

(Kneading)

The following compositions were charged in a pressure kneader and kneaded for 2 hours.

| | |
|---|---|
| Needle-form $\alpha$-$Fe_2O_3$ (DPN-250BW manufactured by Toda Kogyo Corp.; major axis length = 0.15 $\mu$m; specific surface area = 53 $m^2$/g) | 10 parts by weight |
| Carbon black (Raven 760B manufactured by Columbian Chemicals Company; average particle size = 30 nm; specific surface area = 70 $m^2$/g; DPB oil absorption = 48 mL/100 g) | 90 parts by weight |
| The binder solution | 40 parts by weight |

The following compositions were added to the slurry after kneading, and the slurry was adjusted to an optimum viscosity for dispersing treatment.

| | |
|---|---|
| The binder solution | 40 parts by weight |
| MEK | 15 parts by weight |
| Toluene | 15 parts by weight |
| Cyclohexanone | 15 parts by weight |

(Dispersion)

The slurry was dispersed by a sand mill.

(Viscosity Adjusting Solution)

The following compositions were charged into a hyper mixer, and stirred to give a viscosity adjusting solution.

| | |
|---|---|
| Stearic acid | 0.5 part by weight |
| Myristic acid | 0.5 part by weight |
| Butyl stearate | 0.5 part by weight |
| MEK | 100 parts by weight |
| Toluene | 100 parts by weight |
| Cyclohexanone | 100 parts by weight |

(Viscosity Adjustment and Final Coating Material)

After the above solution and the dispersed slurry were mixed with stirring, the mixture was subjected to dispersion treatment again by a sand mill to give a coating material. The coating material was circulation-filtered by using a depth filter with 95% cut filtration accuracy of 1.2 $\mu$m to give a final coating material (k) for lower non-magnetic layer.

Preparation of Lower Non-Magnetic Layer Coating Material(l)

(Preparation of Binder Solution)

| | |
|---|---|
| Vinyl chloride type resin (MR-110, manufactured by Nippon Zeon Co., Ltd.) | 10 parts by weight |
| Polyester polyurethane resin (UR-8300, manufactured by Toyobo Co., Ltd.) | 7 parts by weight |
| MEK | 21 parts by weight |
| Toluene | 21 parts by weight |
| Cyclohexanone | 21 parts by weight |

The above compositions were charged into a hyper mixer and stirred to give a binder solution.

(Kneading)

The following compositions were charged in a pressure kneader and kneaded for 2 hours.

| | |
|---|---|
| Needle-form α-Fe$_2$O$_3$ (DPN-250BW manufactured by Toda Kogyo Corp.; major axis length = 0.15 μm; specific surface area = 53 m$^2$/g) | 10 parts by weight |
| Carbon black (Raven 760B manufactured by Columbian Chemicals Company; average particle size = 30 nm; specific surface area = 70 m$^2$/g; DPB oil absorption = 48 mL/100 g) | 90 parts by weight |
| The binder solution | 40 parts by weight |

The following compositions were added to the slurry after kneading, and the slurry was adjusted to an optimum viscosity for dispersing treatment.

| | |
|---|---|
| The binder solution | 40 parts by weight |
| MEK | 15 parts by weight |
| Toluene | 15 parts by weight |
| Cyclohexanone | 15 parts by weight |

(Dispersion)

The slurry was dispersed by a sand mill.

(Viscosity Adjusting Solution)

The following compositions were charged into a hyper mixer, and stirred to give a viscosity adjusting solution.

| | |
|---|---|
| Stearic acid | 0.5 part by weight |
| Myristic acid | 0.5 part by weight |
| Butyl stearate | 0.5 part by weight |
| MEK | 100 parts by weight |
| Toluene | 100 parts by weight |
| Cyclohexanone | 100 parts by weight |

(Viscosity Adjustment)

After the above solution and the dispersed slurry were mixed with stirring, the mixture was subjected to dispersion treatment again by a sand mill to give a coating material. The coating material was circulation-filtered by using a depth filter with 95% cut filtration accuracy of 1.2 μm.

(Final Coating Material)

To 100 parts by weight of the coating material after filtration, 0.8 part by weight of an isocyanate compound (Coronate-L, manufactured by Nippon Polyurethane) was added, and the mixture was mixed with stirring and circulation-filtered by using a depth filter with 95% cut filtration accuracy of 1.2 μm to give a final coating material (1) for lower non-magnetic layer.

Preparation of Back-coat Layer Coating Material (Preparation of Binder Solution)

Vinyl chloride-vinyl acetate-vinyl alcohol copolymer

| | |
|---|---|
| (Monomer weight ratio = 92:3:5; average degree of polymerization = 420) | 65 parts by weight |
| polyester polyurethane resin (UR-8300, manufactured by Toyobo Co., Ltd.) | 35 parts by weight |
| MEK | 260 parts by weight |
| Toluene | 260 parts by weight |
| Cyclohexanone | 260 parts by weight |

The above compositions were charged into a hyper mixer and stirred to give a binder solution.

(Dispersion)

The following compositions were charged in a ball mill and dispersed for 24 hours.

| | |
|---|---|
| Carbon black (Conductex SC, manufactured by Columbian Chemicals Company; average particle size = 20 nm, BET = 220 m$^2$/g) | 80 parts by weight |
| Carbon black (Sevacarb MT, manufactured by Columbian Chemicals Company; average particle size = 350 nm, BET = 8 m$^2$/g) | 1 part by weight |
| α-Fe$_2$O$_3$ (TF100, manufactured by Toda Kogyo; average particle size = 0.1 μm) | 1 part by weight |
| The binder solution | 880 parts by weight |

(Viscosity Adjusting Solution)

The following compositions were charged into a hyper mixer, and stirred to give a viscosity adjusting solution.

| | |
|---|---|
| Stearic acid | 1 part by weight |
| Myristic acid | 1 part by weight |
| Butyl stearate | 2 parts by weight |
| MEK | 210 parts by weight |
| Toluene | 210 parts by weight |
| Cyclohexanone | 210 parts by weight |

(Viscosity Adjustment)

After the above solution and the dispersed slurry were mixed with stirring, the mixture was subjected to dispersion treatment again by a ball mill for 3 hours. The resulting coating material was circulation-filtered by using a depth filter with 95% cut filtration accuracy of 1.2 μm.

(Final Coating Material)

To 100 parts by weight of the coating material after filtration, 1 part by weight of an isocyanate compound (Coronate-L manufactured by Nippon Polyurethane) was added, and the mixture was mixed with stirring and circulation-filtered by using a depth filter with 95% cut filtration accuracy of 1.2 μm to give a coating material for back-coat layer.

Preparation of Magnetic Tape

Examples 1–10, Comparative Examples 1–4

In Examples 1–10 and Comparative Examples 1–4, coating materials for the upper magnetic layer and the lower non-magnetic layer shown in Tables 1 and 2 were used.

The lower non-magnetic layer coating material was applied onto a surface of a non-magnetic support (polyethylene terephthalate film with a thickness of 8.3 μm) and dried, and resulting layer was calendered and irradiated with electron radiation in nitrogen gas atmosphere to obtain cured layer. Onto the lower non-magnetic layer, the upper magnetic layer coating material was applied, followed by orientation treatment, drying and calendering. Each thickness of the upper magnetic layer and the lower non-magnetic layer after calendering is respectively shown in Tables 1 and 2. Further, the back-coat layer coating material was applied onto the back surface of the non-magnetic support. After drying, calendering was carried out. In all samples, each thickness of the back-coat layer after calendaring was 0.5 μm.

After resulting roll was let to stand at ordinary room temperature for 24 hours, the roll was cured at 60° C. in a heating oven for 24 hours, and then slit down to a width of 8 mm and incorporated in a cassette to give a magnetic tape sample.

Comparative Example 5

The lower non-magnetic layer coating material(1) was applied onto a surface of a non-magnetic support (polyethylene terephthalate film with a thickness of 8.3 μm), and then while the lower non-magnetic layer coating material was in a wet state, the upper magnetic layer coating material(a) was applied thereto, followed by orientation treatment, drying and calendering. Each thickness of the upper magnetic layer and the lower non-magnetic layer after calendering is shown in Table 2. Further, the back-coat layer coating material was applied onto the back surface of the non-magnetic support. After drying, calendering was carried out. A thickness of the back-coat layer after calendering was 0.5 μm.

After resulting roll was let to stand at ordinary room temperature for 24 hours, the roll was cured at 60° C. in a heating oven for 24 hours, and then slit down to a width of 8 mm and incorporated in a cassette to give a magnetic tape sample.

Comparative Example 6

The lower non-magnetic layer coating material (1) was applied onto a surface of a non-magnetic support (polyethylene terephthalate film with a thickness of 8.3 μm) and dried, followed by calendaring and rolling up. After resulting roll was let to stand at ordinary room temperature for 24 hours, the roll was cured at 60° C. in a heating oven for 24 hours. The upper magnetic layer coating material (a) was applied onto the lower non-magnetic layer, followed by orientation treatment, drying and calendering. Each thickness of the upper magnetic layer and the lower non-magnetic layer after calendering is shown in Table 2. Further, the back-coat layer coating material was applied onto the back surface of the non-magnetic support. After drying, calendaring was carried out. A thickness of the back-coat layer after calendaring was 0.5 μm.

After resulting roll was let to stand at ordinary room temperature for 24 hours, the roll was cured at 60° C. in a heating oven for 24 hours, and then slit down to a width of 8 mm and incorporated in cassette to give a magnetic tape sample.

The following is evaluation for each magnetic tape sample obtained.

(Output Variation)

By using a spectrum analyzer (Advantest:TR4171), RF output at the time when a sine wave signal of Frequency 750 kHz was recorded and reproduced by an optimum recording current was measured. The spectrum analyzer was set to a center Frequency at 750 kHz, a Frequency span at 0 Hz and a sweep time at optimum value, and an output variation: Vp-p (dB) was confirmed.

(Running Durability)

In an environment of 20° C. and 60% RH, VTR reciprocating 100 running passes were carried out for 50 tape sample cassettes, and occurrence of running troubles such as running-stop, head clogging and the like was judged by standards below. The deck used: EV-S900 (Hi8 format VTR) manufactured by Sony.

⊚: No troubles occurred at all.

○: Trouble occurred in one cassette.

X: Troubles occurred in two or more cassettes.

(Head Wear)

In an environment of 20° C. and 60% RH, a head projection level of before and after running for 100 hours was measured by an optical comparator, and the difference was represented as head wear (μm).

(Surface Roughness Ra)

By using a feeler type surface-configuration instrument, TALYSTEP system, manufactured by Tayler-Hobson Corp., measured values were obtained by a method described in JIS B-0601. Measurement conditions were filter condition: 0.18 to 9 Hz, needle pressure: 2 mg, needle used: special stylus of 0.1×2.5 μm, scan speed: 0.03 mm/sec, and scan length: 500 μm. Ra (nm) was obtained by the result.

TABLE 1

|  | Example 1 | Example 2 | Example 3 | Example 4 | Example 5 | Comparative Example 1 | Example 6 | Example 7 |
|---|---|---|---|---|---|---|---|---|
| Upper magnetic layer coating material | a | b | c | d | e | b | c | d |
| Lower non-magnetic layer coating material | k | k | k | k | k | k | k | k |
| Thickness of upper magnetic layer(μm) | 0.25 | 0.25 | 0.25 | 0.25 | 0.25 | 0.15 | 0.15 | 0.15 |
| Particle size of upper layer abrasive(μm) | 0.20/0.13 | 0.20 | 0.13 | 0.06 | 0.04 | 0.20 | 0.13 | 0.06 |
| Thickness of lower non-magnetic layer(μm) | 18 | 1.8 | 1.8 | 1.8 | 1.8 | 1.8 | 1.8 | 1.8 |
| Coating method | W/D | W/D | W/D | W/D | W/D | W/D | W/D | W/D |
| Output variation Vp-p (dB) | 0.1 | 0.4 | 0.5 | 0.4 | 0.4 | 0.5 | 0.5 | 0.6 |
| Running durability | ⊚ | ○ | ○ | ○ | ○ | ⊚ | ○ | ○ |
| Head wear(μm) | 0.5 | 0.5 | 0.3 | 0.2 | 0.2 | 3.0 | 0.6 | 0.5 |
| Ra(nm) | 4.5 | 4.3 | 4.0 | 3.8 | 3.7 | 5.2 | 4.4 | 4.2 |

TABLE 2

|  | Example 8 | Example 9 | Example 10 | Comparative Example 2 | Comparative Example 3 | Comparative Example 4 | Comparative Example 5 | Comparative Example 6 |
|---|---|---|---|---|---|---|---|---|
| Upper magnetic layer coating material | e | f | g | h | i | j | a | a |
| Lower non-magnetic layer coating material | k | k | k | k | k | k | l | l |
| Thickness of upper magnetic layer($\mu$m) | 0.15 | 0.15 | 0.15 | 0.25 | 0.25 | 0.25 | 0.25 | 0.25 |
| Particle size of upper layer abrasive($\mu$m) | 0.04 | 0.13/0.06 | 0.13/0.04 | 0.50 | 0.30 | 0.40 | 0.20/0.13 | 0.20/0.13 |
| Thickness of lower non-magnetic layer($\mu$m) | 1.8 | 1.8 | 1.8 | 1.8 | 1.8 | 1.8 | 1.8 | 1.8 |
| Coating method | W/D | W/D | W/D | W/D | W/D | W/D | W/W | W/D |
| Output variation Vp-p(dB) | 0.7 | 0.1 | 0.2 | 0.4 | 0.3 | 0.7 | 3.0 | 2.5 |
| Running durability | ○ | ◎ | ◎ | ◎ | ◎ | ◎ | X | ◎ |
| Head ware($\mu$m) | 0.3 | 0.6 | 0.7 | 7.0 | 5.0 | 8.0 | 0.1 | 0.5 |
| Ra(nm) | 3.9 | 4.4 | 4.3 | 6.5 | 6.0 | 6.5 | 3.8 | 4.8 |

In the coating methods shown in the Tables, W/D represents wet-on-dry coating method and W/W represents wet-on-wet coating method.

As shown in Tables 1 and 2, each of the tape sample in Examples 1–10 did not occur output variations, had a small head wear, and had an excellent running durability. By using two kinds of abrasives having different average particle sizes to each other, we find that output varitations lowered further and running durability was improved still more.

On the other hand, in Comparative Examples 1–4, the average particle size of the abrasive was larger than the thickness of the upper magnetic layer and the head wear became larger. In Comparative Example 5, which was an example of a case that the upper magnetic layer was applied while the lower non-magnetic layer was in a wet state without using the radiation curing type binder resin for the lower non-magnetic layer, the interface between the upper magnetic layer and the lower non-magnetic layer became non-uniform and this resulted in output variations, and also, the running durability was degraded. In Comparative Example 6, which was an example of a case that the upper magnetic layer was applied onto the lower non-magnetic coating layer after thermosetting the lower coating layer, a tightened winding of the lower layer occurred, and coating of the upper magnetic layer was non-uniform resulting in output variations.

As this invention may be embodied in several forms without departing from the spirit or essential characteristics thereof, the foregoing examples are therefore only illustrative and should not be interpreted as restrictive, and all changes that fall within equivalence of claims are therefore intended to be embraced by the claims.

What is claimed is:

1. A process for producing a magnetic recording medium which comprises:

preparing respectively a lower non-magnetic layer coating material including at least a carbon black dispersed into a radiation curing type binder resin, and an upper magnetic layer coating material including at least a ferromagnetic powder, and an abrasive having a Mohs hardness of 6 or higher and a smaller average particle size than a thickness of an upper magnetic layer to be formed into a binder resin, applying the lower non-magnetic layer coating material onto a non-magnetic support, drying the coating material, and carrying out smoothing treatment of and irradiating with radiation to resulting layer to form a lower non-magnetic layer, and then applying the upper magnetic layer coating material onto the lower non-magnetic layer, drying the coating material, and carrying out smoothing treatment of resulting layer to form an upper magnetic layer.

2. The process for producing the magnetic recording medium according to claim 1, wherein an orientation treatment is carried out after the upper magnetic layer coating material is applied.

* * * * *